United States Patent [19]

Gilpin et al.

[11] 3,857,698

[45] Dec. 31, 1974

[54] LIME COMPOSITION FOR BASIC OXYGEN STEEL-MAKING PROCESS

[75] Inventors: William Cecil Gilpin, Welbeck Woodhouse; Barry Bown, Retford; Christopher Stelling Hedley, both of Worksop, all of England

[73] Assignee: Steetley (Mfg.) Limited, Gateford Hill, Worksop, England

[22] Filed: Nov. 6, 1972

[21] Appl. No.: 304,005

[30] Foreign Application Priority Data
Nov. 11, 1971 Great Britain.................... 52528/71

[52] U.S. Cl.............................. 75/24, 75/30, 75/52, 75/55, 148/26, 148/94
[51] Int. Cl............................................. C21c 1/00
[58] Field of Search............... 75/24, 30, 52, 55, 94, 75/95; 148/26

[56] References Cited
UNITED STATES PATENTS

| | | | |
|---|---|---|---|
| 1,925,247 | 9/1933 | Hennig................................ | 75/52 X |
| 2,305,052 | 12/1942 | Yocom................................ | 75/52 X |
| 2,781,256 | 2/1957 | Richards.............................. | 75/52 |
| 3,288,592 | 11/1966 | Tadsen................................ | 75/30 |
| 3,726,665 | 4/1973 | Minnick.............................. | 75/30 |

*Primary Examiner*—Winston A. Douglas
*Assistant Examiner*—John F. Niebling
*Attorney, Agent, or Firm*—Bacon & Thomas

[57] ABSTRACT

A preformed lime composition capable of constituting from 10 to 100% by weight of the lime addition to a steel-making process comprises sufficient magnesia (MgO) as to contribute from 0 to 10% by weight of MgO based on the weight of the lime addition, an amount of lime (CaO) at least 130% by weight based on the weight of the magnesia present, sufficient iron oxide ($Fe_2O_3$) as to contribute from 0 to 20% by weight of $Fe_2O_3$ based on the weight of the lime addition, sufficient aluminum oxide ($Al_2O_3$) as to contribute from 0 to 10% by weight of $Al_2O_3$ based on the weight of the lime addition, sufficient manganese oxide ($Mn_2O_3$) as to contribute from 1 to 10% by weight of $Mn_2O_3$ based on the weight of the lime addition and sufficient silica ($SiO_2$) as to contribute from 0 to 5% by weight of $SiO_2$ based on the weight of the lime addition.

9 Claims, No Drawings

LIME COMPOSITION FOR BASIC OXYGEN STEEL-MAKING PROCESS

This invention relates to a lime composition and in particular to such a composition capable of constituting all or at least a part of the lime addition to a steel-making process.

In the production of steel by the "basic" process as is used for example in the basic oxygen furnace the carbon in the metallic charge is removed by oxidation and evolution as gaseous oxides while the silicon, phosphorus and to a lesser extent the sulphur are removed by a combination of oxidation and reaction with lime to give a complex mixture of silicates, phosphates, etc. commonly referred to as the slag. The composition and physical properties of this slag are of great importance to the effective removal of the silicon, phosphorus, etc. that is, to the refining of the metal into steel. Control of slag composition and properties is therefore an essential feature of steelmaking.

In order to form the slag and make steel as quickly and economically as possible it is necessary to achieve rapid reaction of the lime and to this end it is the practice to use lightly burnt or so called "reactive" lime of high specific surface on the supposition that this will promote rapid reaction. Even so the lime does not always react or "dissolve" as quickly as is desired so that the partly formed slag contains lumps of unreactive lime or is of unduly high viscosity. This effect is often promoted by reaction on the surface of the lumps of lime whereby skins of refractory (i.e., high melting) silicates such as dicalcium silicate are formed which further hinder the dissolution.

To overcome this problem it is the practice to add fluxes of which the most common and most effective is fluorspar. However, fluorspar has certain disadvantages namely that its use results in evolution of fluorine-containing compounds which are hazardous to health and it promotes attack by the slag on the refractory lining of the furnace. Fluorspar is also relatively expensive. Fluorspar is used at a rate of about 4-5 lbs. per ton of steel but especially in basic oxygen furnaces this may rise to as much as 15 lbs. per ton of steel.

We have now surprisingly discovered that a preformed lime composition comprising chiefly lime and magnesia with lesser amounts of aluminium oxide, iron oxide, manganese oxide and silicon oxide can advantageously be used in place of all or at least a substantial part of the lightly burnt "reactive" lime and/or flux, usually fluorspar.

Accordingly the present invention provides a preformed lime composition capable of constituting from 10 to 100% by weight of the lime addition to a steel-making process, which composition comprises sufficient magnesia (MgO) as to contribute from 0 to 10%, preferably 2 to 10%, more preferably 4 to 8%, by weight of MgO based on the weight of the lime addition, an amount of lime (CaO) at least 130% by weight based on the weight of the magnesia present, sufficient iron oxide ($Fe_2O_3$) as to contribute from 0 to 20%, preferably 0 to 10%, by weight of $Fe_2O_3$ based on the weight of the lime addition, sufficient aluminium oxide ($Al_2O_3$) as to contribute from 0 to 10%, preferably 0 to 5%, by weight of $Al_2O_3$ based on the weight of the lime addition, sufficient manganese oxide ($Mn_2O_3$) as to contribute from 1 to 10%, preferably 1 to 6%, by weight of $Mn_2O_3$ based on the weight of the lime addition and sufficient silica ($SiO_2$) as to contribute from 0 to 5% by weight of $SiO_2$ based on the weight of the lime addition.

It will be appreciated that the composition in accordance with the invention must contain either at least 10% by weight of CaO based on the weight of the total lime addition to the steel-making process or at least 130% by weight of CaO based on the weight of the magnesia present in the composition, whichever basis results in a greater lime content.

The composition of the invention may also advantageously contain, either as an integral part thereof or in admixture therewith, small amounts, say from 0.5 to 2.0% by weight based on the weight of the lime addition of other commonly accepted fluxing agents such as boron oxide ($B_2O_3$) or boron compounds yielding equivalent amounts of boron oxide and fluorspar. Inasmuch as certain of the low cost raw materials used in the manufacture of the composition may be ores, natural minerals or waste products, the composition may adventitiously also contain small quantities of other materials, for example, chromium oxide. Clearly in choosing the raw materials of which the composition is made, care will be taken to avoid adventitious substances which can be deleterious to steel or steelmaking, e.g. sulphur. In this respect, although silica is an ingredient of the composition it is limited to a maximum of 5% by weight.

The preformed lime composition may conveniently be in the physical form of mechanically strong particles of a size range commonly referred to as an aggregate, i.e. comprising not less than about 80% of particles of from 1 inch to ⅛ inch and substantially free from dust. Preferably the composition is granular in form, at least 90% of the particles being of a size greater than ⅛ inch. This freedom from dust is in itself of considerable value as "reactive" lime often tends to be friable and to readily form dust which is blown out of the steelmaking furnace and adds to the burden on the exhaust gas cleaning plant and thereby to the cost of production. The density of the preformed lime composition in accordance with the invention is preferably greater than 3.0g/cc.

The preformed lime composition is conveniently manufactured by preparing a graded limestone, magnesium limestone or dolomite, mixing with this an appropriate amount of crushed ores, minerals or waste materials, for example manganesiferous iron ore, pyrolusite, bauxite and bauxite iron ore, to give the desired composition and burning the mixture in a sinter strand or a rotary kiln or other appropriate furnace at a temperature of from 800°–1600°C and for a sufficient time to convert the carbonates present (as limestone etc), substantially wholly to oxides and to cause the oxides at least partially to react together. Thus in another aspect the invention provides a process for preparing a preformed lime composition as described above.

It may be desirable to pelletise or nodulise the mixture before firing, particularly when part or all of the raw materials are in a finely divided condition, say passing a one-fourth inch or one-eighth inch sieve mesh, the firing then normally being carried out in a sinter strand.

In an alternative method, instead of mixing the various ingredients of the composition of the invention before firing it may also be possible to feed the ingredients separately to the furnace.

When boron compounds are to be incorporated into the compositions of the invention, precautions have to be taken since boron compounds would normally be vaporised off during sintering. A possible method of adding the boron compounds is to make the addition during the cooling of the composition after firing.

A preferred preformed lime composition in accordance with the present invention comprises a sintered mixture of dolomite and manganese ore (60 to 75% $Mn_2O_3$). Dolimite consists of approximately equimolar proportions of calcium carbonate and magnesium carbonate which on sintering give $CaO \cdot MgO$, thus in this preferred composition the weight of lime based on the weight of magnesia is about 140%.

This composition however may be varied in accordance with the invention from dolomite plus manganese ore through to dolomite plus manganese ore plus the whole of the lime addition, this latter extreme being a preformed slag without the impurities from the molten metal and being equivalent to the case where the preformed lime composition constitutes 100% by weight of the lime addition. In view of the inclusion in the preformed lime composition of an arbitrary proportion (between 10 and 100%) of the total lime addition to the steel making process it will be appreciated that it is generally unnecessary to specify an upper limit for the lime content of the compositions of the invention.

Although the product as sampled in bulk is of uniform composition it is not essential that each and every lump of aggregate is of uniform composition throughout. In fact it is often desirable that the iron, aluminium and manganese oxides are in greater concentration on the surface of the lumps than at the centre thereof in order to promote breakdown and dissolution.

By "waste materials" as used herein we mean materials arising from other manufactures, e.g. the residue left from chrome ore after it has been processed to produce chromium compounds and which comprises mainly aluminium and iron oxides with a small percentage of silica.

The preformed lime composition may be used in steelmaking either wholly in place of lime e.g. when the composition contains a high proportion of lime or partly in place of lime and it may be added to the furnace either separately from the lime or mixed with it and at the same time or at different times to suit the refining practice.

The amount of preformed lime composition to be used depends on the composition of the metallic charge which is to be worked up into steel and on the amount of lime to be used but will generally be from 10–150 lbs. per ton of steel produced.

It is to be understood that the invention also provides a process for the production of steel which comprises using a preformed lime composition as hereinbefore described to replace at least a substantial part of the lightly burnt "reactive" lime and/or flux, usually fluorspar, normally employed in such a process for promoting slag formation. In yet another aspect the invention provides steel whenever produced by the process of the invention.

The following examples are given to illustrate the present invention:

EXAMPLE 1

Dundas dolomite stone (one-fourth inch) was fed to a kiln at 18 tons per hour together with manganese ore (one-fourth inch) fed at 3.3 tons per hour. The kiln temperature was maintained at about 1600°C.

The dolomite stone had the following analysis:

| | |
|---|---|
| CaO | 30.84% |
| MgO | 21.39% |
| $SiO_2$ | 0.25% |
| $Al_2O_3$ | 0.27% |
| $Fe_2O_3$ | 0.22% |

The manganese ore had the following analysis:

| | |
|---|---|
| $Mn_2O_3$ | 70.97% |
| $SiO_2$ | 6.14% |
| $Al_2O_3$ | 5.15% |
| $Fe_2O_3$ | 3.19% |

The sinter obtained from the kiln had a bulk density of 3.25 g/cc. and had the following chemical analysis:

| | |
|---|---|
| $Mn_2O_3$ | 16.35% |
| $SiO_2$ | 2.30% |
| $Fe_2O_3$ | 1.55% |
| CaO | 51.92% |
| MgO | 17.80% | and the following size analysis:

| | |
|---|---|
| −⅜" + ¼" | 48.2% |
| −¼" + 3/16" | 32.9% |
| −3/16" + ⅛" | 16.5% |
| −⅛" | 2.4% |

A number of trial steel-making heats were run using the above sinter as the preformed lime composition forming part of the flux addition in accordance with the present invention. Details of the heats are given in the following Table 1:

TABLE 1

| Heat No. | 1 | 2 | 3 | 4 | 5 | 6 | 7 |
|---|---|---|---|---|---|---|---|
| Hot Metal | | | | | | | |
| Temperature °F. | 2525 | 2542 | 2516 | 2617 | 2525 | 2541 | 2490 |
| Si | 1.07 | 1.36 | 1.31 | 1.53 | 1.53 | 1.15 | 0.92 |
| Mn [wt.%] | 1.16 | 1.23 | 1.27 | 1.22 | 1.22 | 1.21 | 1.12 |
| S | 0.020 | 0.015 | 0.015 | 0.014 | 0.014 | 0.014 | 0.013 |
| Metallic Charge Wt. (lbs) | | | | | | | |
| Hot Metal | 207100 | 209300 | 197000 | 198400 | 203100 | 208400 | 214800 |
| Scrap | 86800 | 80400 | 102500 | 96900 | 97600 | 83600 | 76000 |
| % Hot Metal | 70.47 | 72.25 | 65.78 | 67.18 | 68.68 | 71.37 | 73.86 |

TABLE 1—Continued

| Heat No. | 1 | 2 | 3 | 4 | 5 | 6 | 7 |
|---|---|---|---|---|---|---|---|
| Flux Additions (lbs) | | | | | | | |
| Lime | 18320 | 18800 | 16460 | 17940 | 18260 | 16980 | 17300 |
| Iron Ore | — | — | — | — | — | 1000 | 2000 |
| Dolime | 2200 | 2200 | 2200 | 2200 | — | 2200 | 2200 |
| Sinter of Example 1 | 2800 | 2800 | 2800 | 2800 | 2800 | 2800 | 2800 |
| Fluorspar | 250 | 500 | — | — | — | 250 | 270 |
| First Turndown Steel | | | | | | | |
| Temperature °F | 2905 | 2960 | 2835 | 2995 | 3020 | 2920 | 2880 |
| C | 285 | 385 | 090 | 093 | 094 | 770 | 530 |
| Mn (% x.001) | 300 | 370 | 200 | 360 | 350 | 380 | 390 |
| S | 020 | 019 | 039 | 020 | 020 | 020 | 020 |
| First Turndown Slag (wt.%) | | | | | | | |
| Total Fe | 14.4 | 12.7 | 11.0 | 10.8 | 10.0 | 14.7 | 13.5 |
| FeO | 6.2 | 5.2 | 5.5 | 3.5 | 3.6 | 5.8 | 6.8 |
| $SiO_2$ | 18.0 | 19.8 | 23.5 | 20.3 | 20.5 | 20.3 | 18.6 |
| CaO | 45.3 | 46.5 | 42.0 | 46.7 | 45.9 | 44.8 | 43.8 |
| MgO | 5.3 | 5.0 | 5.9 | 7.4 | 3.5 | 5.3 | 4.8 |
| $Al_2O_3$ | 1.2 | 1.2 | 3.1 | 0.7 | 0.8 | 0.6 | 0.6 |
| MnO | 8.0 | 7.1 | 7.9 | 7.6 | 7.9 | 8.6 | 9.9 |
| P | 0.13 | 0.13 | 0.13 | 0.14 | 0.13 | 0.14 | 0.18 |
| Lime:Silica (wt.ratio) | 2.5 | 2.4 | 1.8 | 2.3 | 2.3 | 2.2 | 2.4 |
| No. of Turndowns | 2 | 2 | 4 | 5 | 5 | 2 | 2 |
| Time (Mins) Charge-Tap | 50 | 46 | 63 | 56 | 58 | 43 | 38 |
| Slag Quality | ** | ** | ** | ** | ** | ** | * |

\** Slag acceptable
\* Slags acceptable but not observed.

EXAMPLE 2

Whitwell dolomite (1½ inches) and manganese ore (one-fourth inch) were charged to a rotary kiln in the weight ratio of 8:1 and fired at 1600°C.

The dolomite had the following analysis:

| | |
|---|---|
| CaO | 30.63% |
| MgO | 21.50% |
| $SiO_2$ | 0.33% |
| $Al_2O_3 + Fe_2O_3$ | 0.52% |

The Manganese ore had the following analysis:

| | |
|---|---|
| $Mn_2O_3$ | 64.16% |
| $SiO_2$ | 4.38% |
| $Al_2O_3$ | 7.08% |
| $Fe_2O_3$ | 9.85% |

The sinter obtained from the kiln had a bulk density of 3.09 g/cc. and had the following chemical analysis:

| | |
|---|---|
| $Mn_2O_3$ | 12.09% |
| $SiO_2$ | 1.21% |
| $Fe_2O_3$ | 2.53% |
| CaO | 48.94% |
| MgO | 34.23% |

The above sinter constituted a suitable preformed lime composition in accordance with the invention for addition with lime to steel making batches.

EXAMPLE 3

The following ingredients were fed to a rotary kiln in the batches and parts by weight indicated:

| | COLUMN | | | | |
|---|---|---|---|---|---|
| BATCH NO. | 1 | 2 | 3 | 4 | 5 |
| Whitwell dolomite | 100 | 100 | 100 | 100 | 100 |
| Manganese ore | 10 | 10 | 12 | 10 | 12 |
| Limestone | 0 | 0 | 100 | 0 | 400 |
| Borax ($B_2O_3$) | 10 | 0 | 0 | 0 | 0 |
| Millscale ($Fe_2O_3$) | 0 | 10 | 30 | 10 | 0 |
| $Al_2O_3$ | 0 | 0 | 0 | 5 | 0 |

In each case a sintered material in accordance with the invention was obtained which provided an excellent flux for addition with lime to steel-making batches, the proportion of flux to lime being such as to give 6% by weight of magnesia in the slag.

We claim:

1. In the basic oxygen steel-making process, the improvement in combination therewith which comprises adding to the basic oxygen steel-making furnace as a basic slag-forming ingredient a preformed particulate composition consisting essentially of from 2 to 10% by weight of magnesia (MgO) based on the weight of the total lime addition to the steelmaking process, from 10 to 100% by weight of lime (CaO) based on the total lime addition to the steel-making process or at least 130% by weight of lime based on the weight of the magnesia content, whichever basis results in a greater lime content, iron oxide ($Fe_2O_3$) in an amount no greater than about 20% by weight based on the total lime addition, from 0 to 10% by weight of alumina ($Al_2O_3$) based on the total lime addition, from 1 to 10% by weight of manganese oxide ($Mn_2O_3$) based on the total lime addition and from 0 to 5% by weight of silica ($SiO_2$) based on the total lime addition.

2. The process according to claim 1 wherein the composition comprises from 4 to 8% by weight of magnesia.

3. The process according to claim 1 wherein the composition comprises iron oxide in an amount not in excess of about 10% by weight based on the total lime addition.

4. The process according to claim 1 wherein the composition comprises from 0 to 5% by weight of aluminium oxide.

5. The process according to claim 1 wherein the composition comprises from 1 to 6% by weight of manganese oxide.

6. The process according to claim 1 wherein the composition comprises a small amount of at least one other commonly accepted fluxing agent.

7. The process according to claim 1 wherein at least 90% of the particles of the composition are of a size greater than one-eighth inch.

8. The process according to claim 1 wherein the composition has a density greater than 3.2g/cc.

9. The process according to claim 1 wherein the composition consists essentially of a sintered mixture of dolomite and iron-containing manganese ore.

* * * * *